April 28, 1970 R. E. DIECKMANN Re. 26,872
SEMI-AUTOMATIC PISTOL
Original Filed Nov. 1, 1965 3 Sheets-Sheet 1
Fig. 1.
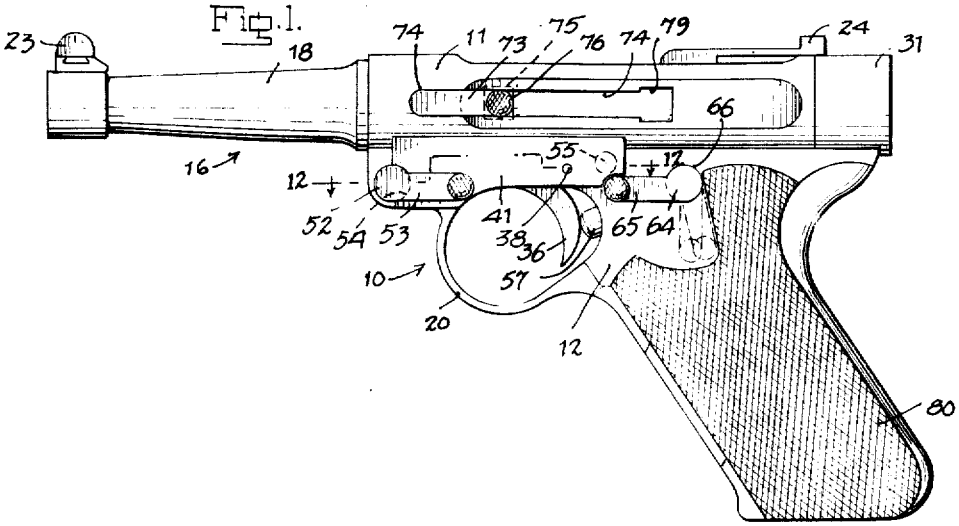
Fig. 2.
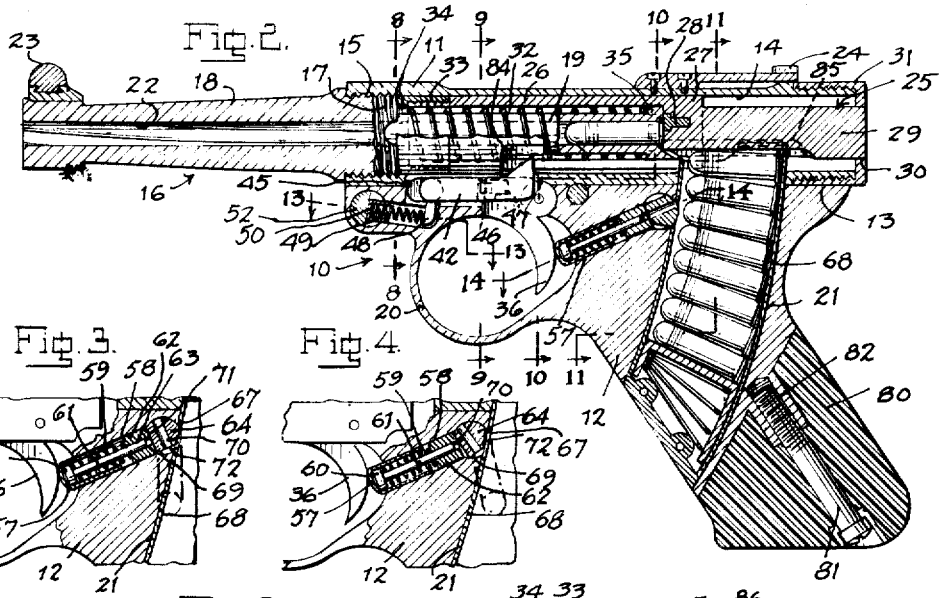
Fig. 3.
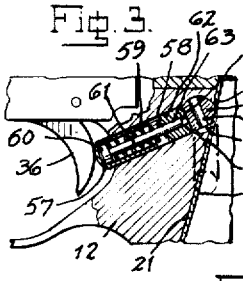
Fig. 4.
Fig. 5.
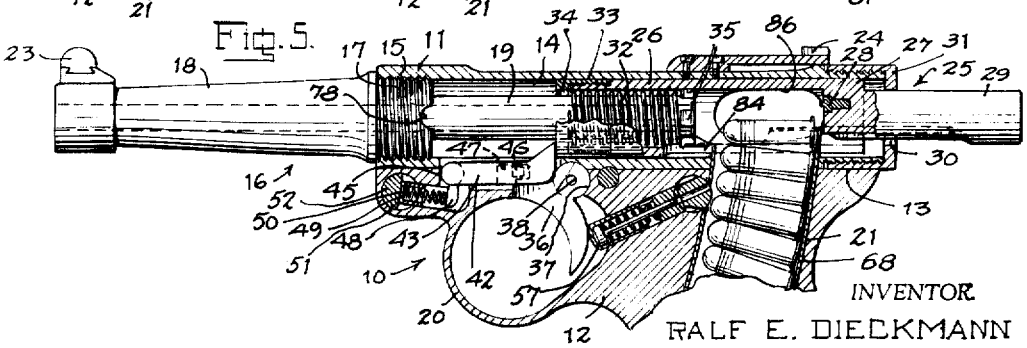
INVENTOR
RALF E. DIECKMANN
BY
Watson, Ware and Davis
ATTORNEYS

SEMI-AUTOMATIC PISTOL

Original Filed Nov. 1, 1965 3 Sheets-Sheet 2

INVENTOR.
RALF E. DIECKMANN
BY
Matters, Ware and Davis
ATTORNEYS.

SEMI-AUTOMATIC PISTOL

Original Filed Nov. 1, 1965 3 Sheets-Sheet 3

INVENTOR.
RALF E. DIECKMANN
BY
Matter, Vargan and Davis
ATTORNEYS.

United States Patent Office

Re. 26,872
Reissued April 28, 1970

26,872
SEMI-AUTOMATIC PISTOL

Ralf E. Dieckmann, Stratford, Conn., assignor to Bridgeport Firearms Company, Monroe, Conn., a corporation of Connecticut Original No. 3,276,323, dated Oct. 4, 1966, Ser. No. 505,849, Nov. 1, 1965, which is a continuation-in-part of application Ser. No. 385,895, July 29, 1964. Application for reissue July 26, 1968, Ser. No. 754,509
Int. Cl. F41c *5/00, 13/00*
U.S. Cl. 89—195 13 Claims

Matter enclosed in heavy brackets [ ] appears in the original patent but forms no part of this reissue specification; matter printed in italics indicates the additions made by reissue.

*ABSTRACT OF THE DISCLOSURE*

*A hand held pistol-type firearm having a barrel of greatly increased length over similar known firearms to increase the accuracy thereof. A curved magazine extends through the handgrip from the front face thereof to the upper portion thereof proximate the rear end of the receiver, and the barrel extends into the receiver to a point adjacent the forward end of the upper end of the magazine so that the barrel extends over a major portion of the length of the receiver.*

This application is a continuation-in-part of application Ser. No. 385,895 filed July 29, 1964, now abandoned.

This invention relates to pistols of the semi-automatic type and has for one particular object to provide a semi-automatic hand gun with increased barrel-length without increasing the overall length of the pistol, which has the advantage of giving a better performance of the projectile or bullet in that it increases the accuracy of the pistol. This adds to the balance of the pistol and does not make it as clumsy to handle as an increased external length would.

Another object is to increase the muzzle velocity and thus the distance which the bullet will travel. All cartridges now used are made with progressive gunpowder and, as balance length is the governing factor in increasing the muzzle velocity and thus increasing the distance the projectile travels, this object is attained by this invention.

Another object of this invention is to provide a pistol in which the sear is of the automatic self-disconnecting type which eliminates the use of a separate disconnector as in other pistols. This also prevents the firing of more than one shot at a time. This type of mechanism has been used before in military firearms but never in pistols.

A further object of this invention is to provide a curved magazine of a shape in which the cartridges lie in a more natural position than they would in a square magazine. In my pistol the cartridges are stacked in the magazine in a curved position thus avoiding jamming the action of the gun.

Another object is to provide a pistol which can also be used with rimless cartridges in a straight magazine. In my invention a straight magazine can also be used with rimless cartridges, whereas with a curved magazine only rimmed cartridges can be effectively used, because in the use of a straight magazine the rims on the cartridge are liable to become jammed or entangled or wedged one with the other and thus jam the action of the gun. Another object is that in my invention the position of the magazine is such that the barrelling of the gun is increased.

Another object achieved in my pistol is that by inserting the magazine in the front part of the handgrip or receiver, the magazine cannot drop out while firing, due to the position of the hand and fingers about the handgrip, thus eliminating the results of any mechanical failure of the magazine catch.

Another object of my invention is that the positioning of the magazine in the handgrip, hereinafter referred to as the receiver, eliminates the prior necessity or custom of having the whole receiver fabricated of metal. My invention would lower the cost of production and reduce the weight of the pistol.

Another object of my invention is that the elimination of any metal below the magazine, lends itself to the production of the end of the receiver by the use of plastic compounds. This will reduce production costs and weight and eliminate grips and screws.

Another object of this invention is that the unique arrangement of the magazine provides an increased area between the magazine and the trigger, thus permitting greater freedom in the design and placement of the trigger mechanism, as well as trigger safety means and magazine catch means that may be associated therewith.

Another object of this invention is that in my pistol the design of the breechblock is tubular as are all the other parts housed therein. This lends itself to easier manufacturing and cheaper costs.

Another object of my invention is that the trigger may be positioned in such a way as to accommodate all sizes of hands and fingers and the pistol may be fired by the left or right hand. This would make the pistol easier to handle and easier to fire.

Another object of my invention is that the receiver of my pistol has a minimum of cut-outs which would make it easier and cheaper to manufacture.

A further object of my invention is to provide a pistol with the minimum number of working parts. For example, my pistol may have approximately thirty-six parts in all, including approximately twenty-two working or movable parts, and approximately fourteen stationary parts. This compares with conventional pistols which have forty to forty-five parts. My invention would reduce the cost of manufacture and reduce the weight of semi-automatic pistols.

A still further object of my invention is that all the working parts of my pistol can be stripped or taken apart without the use of any tools.

Other objects and advantages will become apparent from a consideration of the following detailed description taken in connection with the accompanying drawings wherein a satisfactory embodiment of the invention is shown. [However, it will be understood that the invention is not limited to the details disclosed but includes all such variations and modifications as fall within the spirit of the invention and the scope of the appended claims.]

In the drawings:

FIGURE 1 is a side elevation of a pistol according to the invention, the safety lever being shown in full lines in its off position for the normal operation of the pistol and the dot-and-dash lines respectively showing the lever in safety position and in position to release the magazine;

FIGURE 2 is a longitudinal vertical sectional view showing the breechblock in normal uncocked position;

FIGURE 3 is a fragmentary view, partially in side elevation and partially in longitudinal section, showing the safety lever in its on or safety position to prevent actuation of the trigger;

FIGURE 4 is a similar view showing the safety lever in position to release the magazine;

FIGURE 5 is a longitudinal vertical sectional view partially broken away showing the breechblock in cocked position.

Figure 6:
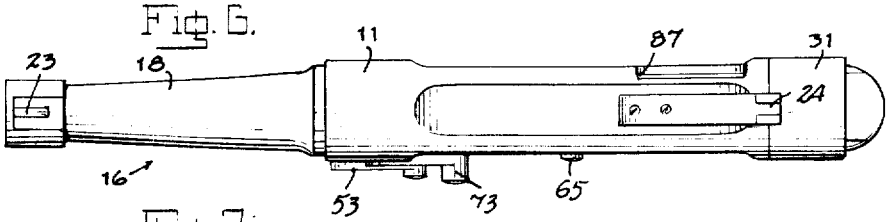
FIGURE 6 is a top plan view of the pistol.

Referring to the drawings, the semi-automatic pistol, according to the exemplary embodiment of the invention illustrated therein, comprises a body or frame 10 including an upper receiver part 11 and a lower handgrip part 12, the receiver part being in the form of a generally cylindrical tube fixed as by brazing within a longitudinal recess 13 in the upper side of the handgrip part. The receiver has a longitudinal slide passage 14 and is internally threaded at its forward end as at 15 to receive the barrel 16, which comprises an intermediate threaded part 17 screwed into the threaded end 15 of the receiver, a forward part 18 extending forwardly from the receiver, and a rearward part 19 extending into the slide passage 14 of the receiver for a distance substantially greater than half its length. Thus the rearward end of the barrel is at a point forwardly spaced from the rearward end of the passage and substantially rearwardly of the trigger guard loop 20 provided at the forward side of the handgrip beneath the receiver, and is forwardly adjacent to the forward end of the magazine guideway 21. The magazine guideway is preferably inclined downwardly and forwardly in opposite direction to the downward and rearward inclination of the handgrip with its upper end opening to the receiver and its lower end opening to the forward side of the handgrip.

The barrel 16 has a rifled bore 22 and is provided at its forward end with a front sight 23 in line with a rear sight 24 secured upon the upper side of the receiver.

The rearward part 19 of the barrel is of smaller diameter than the passage 14 of the receiver to provide an encircling space between them for telescoping engagement of the breechblock 25 which is reciprocally mounted in the receiver passage 14 for projecting and retracting movement.

The breechblock 25 comprises a forward cylindrical tubular part 26 normally disposed about the rearward barrel part 19, an intermediate part 27 for engagement with rearward end of the barrel and provided with a firing pin 28, and a rearward part 29 slidably engaged at its rearward end in an opening 30 of a closure cap 31 screwed upon the rearward end of the receiver. A helical recoil spring 32 surrounds the rearward part 19 of the barrel within the forward tubular part 26 of the breechblock, being abutted at its forward end by an inwardly flanged cap 33 screwed upon the forward end of the breechblock and provided in its flange with circumferentially spaced inwardly opening recesses 34, and at its rearward end by outwardly projecting circumferentially spaced lugs 35, FIGURE 10, in longitudinal line with and of a size to pass through the recesses 34, whereby the barrel, the breechblock, and the recoil spring may be readily assembled or disassembled as a unit with respect to the receiver.

The action of the piston of the invention is preferably of conventional blowback type with a fixed firing pin, and the trigger mechanism has a self-disconnecting sear which prevents the firing of more than one shot at a time. It will be understood, however, that the invention is not limited with respect to these features.

Figure 10:
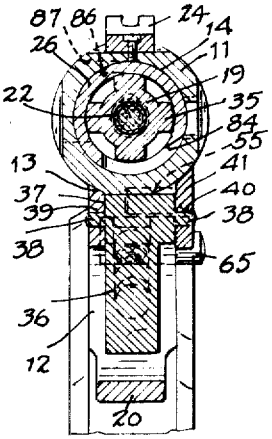
FIGURE 10 is a transverse vertical sectional view on an enlarged scale taken along the line 10—10 in FIGURE 2.
Figure 12:
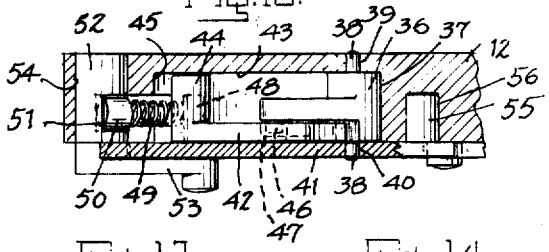
FIGURE 12 is a fragmentary horizontal sectional view taken along the line 12—12 of FIGURE 1.
Figure 13:
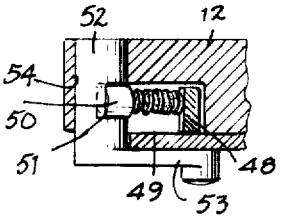
FIGURE 13 is a fragmentary horizontal sectional view taken along the line 13—13 of FIGURE 2.
Figure 14:
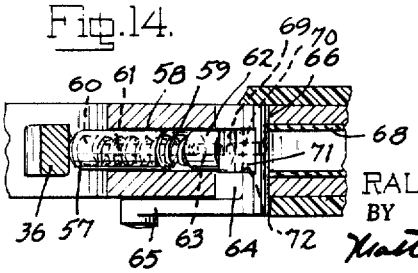
FIGURE 14 is a fragmentary horizontal sectional view taken along the line 14—14 of FIGURE 2.
Figure 15:
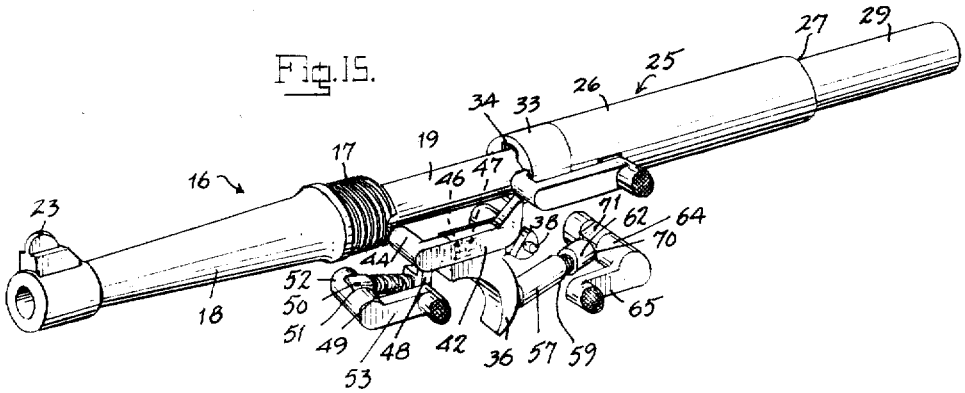
FIGURE 15 is a perspective view showing the barrel, the trigger and sear mechanism, and the breechblock in separated relation from the receiver, the breechblock being shown in cocked position.

The trigger 36 is positioned within an opening 37 in the frame and has trunnion pivot ends 38—38 engaged in bearing holes 39 and 40, FIGURES 10 and 12, respectively provided in the frame at one side and in a cover plate 41 at the other side, the finger engaging curved part of the trigger extending into the guard loop 20. The sear 42 is disposed between the outer face of the trigger and the cover plate within an opening 43 in the frame and has a pivot stud 44 at its forward end slidably and rotatably engaged in a slot 45 in the frame, the nose portion of the sear being provided at its rearward end for cocking engagement with the breechblock, as will presently more fully appear. A lug 46 upon the outer face of the trigger is engaged in a bayonet type slot 47 in the inner face of the sear opening to its underside. In the rearwardly moved position of the sear as seen in FIGURE 2 with the breechblock uncocked the trigger may be activated without activating the sear, while in the forwardly moved position of the sear seen in FIGURE 5, with the breechblock cocked the trigger is interlocked with the sear to activate it.

A finger 48 extends downwardly from the pivot stud 44 and is engaged at its forward side by one end of a helical spring 49, the other end of the spring being seated in a cup member 50 engaged in a semicylindrical cut-out 51 of the cylindrical hub part 52 of a lever 53 disposed in a transverse bearing hole 54 in the frame. The engagement of the cup member in the cut-out of the hub part retains the lever in place in its normal position, as seen in FIGURE 1, where it overlies the cover plate 42 to retain it in place. The cover plate is positioned on the frame by a dowel pin 55 engaged in a hole 56 in the frame, FIGURE 12. In order to remove the cover plate to permit disassembly of the trigger mechanism the lever 53 is swung downwardly in clockwise direction to clear the cover plate and at the same time to force the cup member from the cut-out 51 to the cylindrical surface of the hub part 52 to enable removal of the lever.

The trigger is normally pressed in clockwise direction by a cup-shaped plunger 57 disposed in a passage 58 in the frame. A spring 59 is interposed between the head 60 of a locking pin 61 disposed in the plunger 57 and a block member 62 having a passage 63 slidably engaged by the pin. The block member is spring pressed against the hub part 64 of a safety lever 65 engaging in a hole 66 in the frame, the hub being normally projected into the magazine guideway 21 where it engages within an opening 67 in the magazine 68 to retain it. The hub 64 is provided with a flat surface 69 normal to a passage 70 through the hub, which passage in the normal off-safety position is in line with the passage 63 of the block member 62 and the pin 61, so that the latter is free to move inwardly to permit actuataion of the trigger. The hub is provided with a second flat surface 71 at right angles to the surface 69 which is adapted through swinging of the safety lever 90° to the position as seen in FIGURE 3 to block inward movement of the pin and prevent actuation of the trigger. A third flat surface 72 is adapted through a slight further movement of the lever in counterclockwise direction against the pressure of the spring 59 to clear the hub from engagement within the opening 67 of the magazine to thus release it. The hub is retained in the frame through engagement of the block member with the flat surfaces of the hub and may be released to permit removal by bringing the lever to a point where the corner surface at the junction of the flat surfaces 69 and 71 engages the block member and clears it from the hole 66.

Figure 9:
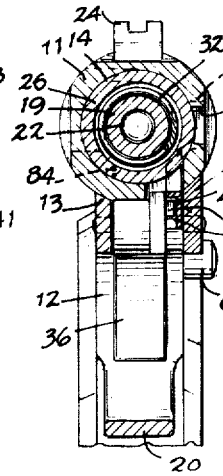
FIGURE 9 is a transverse vertical sectional view on an enlarged scale taken along the line 9—9 of FIGURE 2.

A cocking handle 73 for manual cocking of the breechblock is engaged for sliding movement in a slot 74 in the receiver and is connected to the breechblock by a rectangular lug 75 at one end engaged in a rectangular hole 76 in the breechblock and by a hook portion 77 at its other end engaged in one of the recesses 34 of the cap 33. The forward end of the handle in its forward position as seen in FIGURES 1 and 9 projects forwardly from the breechblock and is adapted to seat in a recess 78 in the threaded intermediate portion 17 of the barrel to thus prevent turning of the barrel. The lug 75 is wider than the slot 74 and thus retains the handle in engagement with the hole 76. In order to assemble or disassemble the handle a rectangular enlargement 79 which permits transverse passage of the lug is provided at the rearward end of the slit 74 beyond the normal retracted position of the breechblock. By removing the closure cap 31 from the rearward end of the receiver the breechblock may be retracted beyond its normal position to bring the lug into line with the enlargement 79.

The grip 80 is a generally U-shape and may be molded in one piece from suitable plastic material. It is attached by a single screw 81 engaged in a tapped hole 82 in the lower end of the frame which lies contiguous to the rearward side of the inclined magazine. The arrangement thus permits a substantial part of the handgrip to be formed of lightweight plastic material.

Figure 11:
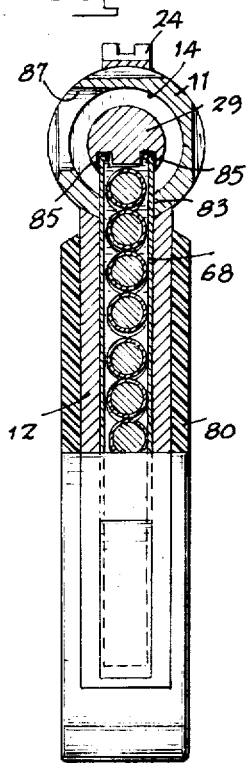
FIGURE 11 is a transverse vertical sectional view on an enlarged scale taken along the line 11—11 of [FIG-] *FIGURE 2*.

The magazine 68 extends at its upper end through an opening 83 in the receiver where it is [dispersed] *disposed* in line with a slot 84 in the tubular part 26 of the breechblock with its upper edges engaged in longitudinal slots 85—85 in the lower side of the rearward part of the receiver, FIGURE 11.

Figure 7:
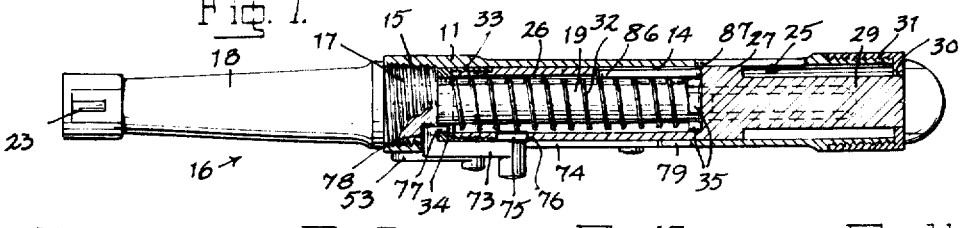
FIGURE 7 is a view partially in top plan and partially in horizontal longitudinal section with the breechblock in the normal uncocked position as seen in FIGURE 2.
Figure 8:
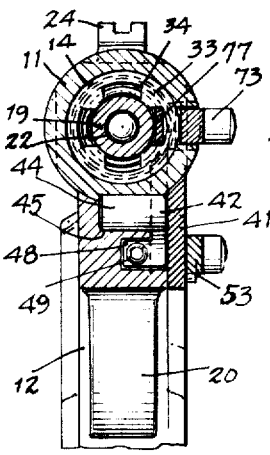
FIGURE 8 is a transverse vertical sectional view on an enlarged scale taken along the line 8—8 of FIGURE 2.

A cartridge ejection opening 86 in one side of the breechblock is adapted in the retracted position of the breechblock to register with an ejection opening 87 in one side of the receiver. *As best seen in FIGURES 5 and 7, the ejection opening 87 in the receiver is disposed in spaced proximate relationship with the rear end of the receiver and in substantial alignment with the upper end of the magazine guideway, and the rearward part 19 of the barrel terminates at a point adjacent the forward end of the opening 87. Thus according to the invention the length of the barrel portion 19 within the slide passage 14 extends over a major portion of the length of the receiver.*

Figure 16:
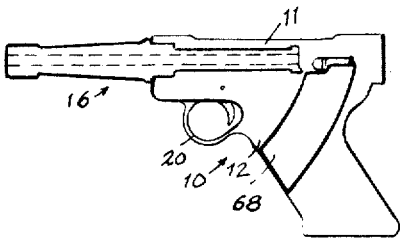
FIGURES 16, 17 and 18 are diagrammatic views, respectively showing for comparison purposes one embodiment of the invention having a curved magazine, another embodiment of the invention having a straight magazine, and a pistol having the magazine in conventional arrangement.
Figure 17:
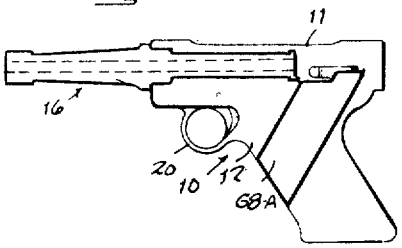
Figure 18:
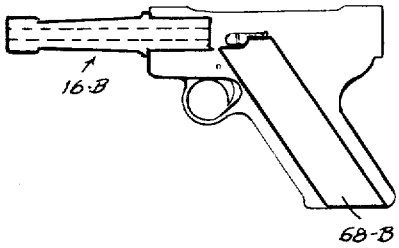

It will be noted from a comparison of the diagrammatic FIGURES 16 and 17, respectively showing a curved magazine 68 and a straight magazine 68–A slanted forwardly and downwardly, with the conventional magazine arrangement shown in FIGURE 18, wherein the magazine 68–B is slanted in the opposite direction, that in the pistol of the invention the length of the barrel 16 is substantially increased over that of the barrel 16–B of the conventional pistol without increasing the overall length of the pistol. In the example illustrated the barrel length is increased about 2½ inches. The advantage is obvious since a longer barrel gives a better performance of the projectile.

The operation is as follows:

With a full magazine in place the breechblock is manually retracted by means of the handle 73 from the projected position of FIGURE 2 to the retracted position of FIGURE 5. The sear [43] *42* which has its nose portion disposed in the slot 83 in the projected position is depressed as the breechblock is moved into cocked position in front of the breechblock as seen in FIGURE 5 where the force of the recoil spring 32 moves the sear forwardly against the lesser pressure of the spring 50 to bring the bayonet slot 47 into cooperatively relation with the lug 46 of the trigger. When the trigger is squeezed, the sear releases the breechblock which is then driven forwardly stripping a cartridge out of the magazine and feeding it into the bore or firing chamber of the barrel. As the cartridge is seated in the bore of the barrel it is simultaneously fired by the fixed firing pin 28 projecting from the face of the intermediate portion 27 of the breechblock.

The force which fires the cartridge consists of the momentum of the breechblock. When the powder charge explodes, it creates pressure in all directions and pushes the projectile out of the barrel since this offers the least amount of resistance. After the projectile has left the barrel the force of the explosion extracts the fired shell of the cartridge and drives the breechblock to retracted position causing the sear to be activated to retain the breechblock in the retracted position. Thereafter the pistol may again be fired by actuating the trigger.

Having described my invention, what I claim as new and desire to secure by Letters Patent is:

1. A firearm comprising:

(A) a body including
  (1) a receiver having a longitudinal slide passage,
  (2) a handgrip extending downwardly from said receiver having forward and rearward sides and a lower butt end, and
  (3) a trigger guard loop at the forward side of said handgrip beneath said receiver, (B) a barrel having a longitudinal bore and including
  (1) an intermediate part fastened within the forward end of said receiver,
  (2) a forward part extending forwardly from said receiver, and
  (3) a rearward part extending into said slide passage with an encircling space between said rearward part and said passage and with its rearward end in forwardly spaced relation to the rearward end of said passage and at a point substantially rearwardly of said trigger guard loop and the upper end of the forward side of said handgrip, (C) a breechblock reciprocally mounted in said passage for projecting and retracting movement including
  (1) a forward tubular part surrounding said rearward part of said barrel within said encircling space and
  (2) a rearward part in longitudinal line with said bore of said barrel, (D) a recoil spring surrounding said rearward part of said barrel and disposed within said tubular forward part of said breechblock,
  (1) abutment means at the forward end of said tubular part engaged by the forward end of said spring, and
  (2) abutment means at the rearward end of said barrel engaged by the rearward end of said spring, whereby said spring exerts projecting force on said breechblock, (E) a magazine guideway opening at its upper end to said passage rearwardly adjacent the rearward end of said barrel and opening at its lower end to said forward side of said handgrip, (F) a magazine engaged within said guideway for feeding cartridges to said receiver for movement into said bore of said barrel through projecting movement of said breechblock, (G) a trigger mounted in said body and disposed within said trigger guard loop, and (H) a sear operatively associated with said trigger arranged to retain said breechblock in its retracted position and to release said breechblock upon actuation of said trigger.

2. A firearm as defined in claim 1, wherein the length of said breechblock substantially corresponds to the length of said slide passage and said rearward part is adapted upon retraction to [protect] *project* rearwardly from said slide passage.

3. A firearm as defined in claim 1, wherein the length of said breechblock substantially corresponds to the length of said slide passage and said rearward part is adapted upon retraction to project rearwardly from said slide passage, and further characterized by a removable cap at the rearward end of said slide passage having an opening in which said rearward part is slideable.

4. A firearm as defined in claim 1, wherein the rearward end of said barrel is at a point spaced from the forward end of said [guide] *slide* passage more than half the length of said [guide] *slide* passage.

5. A firearm as defined in claim 1, wherein said receiver is internally threaded forwardly of said slide passage, and said intermediate part of said barrel is externally threaded for screw engagement with said internally threaded end of said receiver.

6. A firearm as defined in claim 1, wherein the rearward end of said barrel is so positioned that it lies substantially directly over the center of the hand of the user engaged about said handgrip.

7. A firearm as defined in claim 1, wherein said magazine guideway is inclined downwardly and forwardly from said receiver to the forward side of said receiver.

8. A firearm as defined in claim 1, wherein said handgrip is inclined rearwardly and downwardly from said receiver, and wherein said magazine guideway is inclined downwardly and forwardly from said receiver to the forward side of said handgrip.

9. A firearm as defined in claim 1, wherein said handgrip is inclined rearwardly and downwardly from said receiver, and wherein said magazine guideway is inclined downwardly and forwardly from said receiver to the forward side of said handgrip and is curved in a vertical longitudinal plane with its concave side forward.

*10. A firearm comprising*

*(A) a receiver having a longitudinal slide passage extending therethrough and an elongate lateral opening disposed in spaced proximate relationship with the rear end of said receiver,*

*(B) a handgrip extending downwardly and rearwardly from said receiver and having forward and rearward sides, said forward side terminating upwardly substantially forwardly of the forward end of said lateral opening in said receiver,*

*(C) a magazine guideway in said handgrip having an upper end opening into said slide passage in substantial alignment with said lateral opening and extending downwardly and forwardly and having a lower end opening in said forward side of said handgrip,*

*(D) a barrel mounted in said receiver and extending inwardly in said slide passage from the forward end of said receiver, said barrel terminating rearwardly at a point adjacent the forward end of said lateral opening and said upper end of said magazine guideway and substantially rearwardly of the upper end of said forward side of said handgrip, whereby the length of said barrel within said slide passage extends over a major portion of the length of said receiver,*

*(E) a magazine engaged within said guideway for feeding cartridges to said slide passage, and*

*(F) a firing mechanism carried by said receiver and operative when actuated to successively move cartridges from said magazine into the rear end of said barrel, fire the cartridges and effect the spent cartridges through said lateral opening in said receiver.*

*11. A firearm according to claim 10 wherein said firing mechanism comprises a breechblock slidably mounted in said slide passage for reciprocatory movement between a forwardly projected position and a rearwardly retracted position, a firing pin carried by said breechblock, a trigger pivotally mounted on said receiver and disposed thereon substantially at the upper end of said forward side of said handgrip, whereby said trigger is disposed substantially forwardly of the rear end of said barrel, and means operatively interconnected between said trigger and said firing pin for causing a firing movement of the latter.*

*12. A firearm comprising*

*(A) a receiver having a longitudinal slide passage extending therethrough,*

*(B) a trigger pivotally mounted on the underside of said receiver at a location spaced from the forward end of said receiver less than half the length of said receiver,*

*(C) a handgrip extending downwardly and rearwardly from said receiver and having forward and rearward sides, said forward side terminating upwardly at a location substantially adjacent said trigger,*

*(D) a magazine guideway in said handgrip having an upper end opening into said slide passage in spaced proximate relationship with the rear end of said receiver and extending downwardly and forwardly and having a lower end opening in said forward side of said handgrip,*

*(E) a barrel mounted in said receiver and extending inwardly in said slide passage from the forward end of said receiver for a distance substantially greater than half the length of said receiver, said barrel terminating rearwardly at a point adjacent the forward end of said upper end of said magazine guideway and substantially rearwardly of said trigger and the upper end of said forward side of said handgrip, whereby the length of said barrel within said slide passage extends over a major portion of the length of said receiver,*

*(F) a magazine engaged within said guideway for feeding cartridges to said slide passage, and*

*(G) a firing mechanism operable in response to actuation of said trigger to successively move cartridges from said magazine into the rear end of said barrel, fire the cartridges and eject the spent cartridges from said receiver.*

*13. A firearm according to claim 12 wherein said receiver includes an elongate lateral opening disposed in spaced proximate relationship with the rear end of said receiver and in substantial alignment with said upper open end of said magazine guideway through which spent cartridges are ejected from said slide passage.*

No references cited.

BENJAMIN A. BORCHELT, Primary Examiner

S. C. BENTLEY, Assistant Examiner